United States Patent [19]

Buckley

[11] Patent Number: 5,078,344
[45] Date of Patent: Jan. 7, 1992

[54] RIBLESS RAM AIR PARACHUTE

[75] Inventor: James A. Buckley, Inyokern, Calif.

[73] Assignee: The United States of America as represented by the Secretary of the Navy, Washington, D.C.

[21] Appl. No.: 519,626

[22] Filed: May 7, 1990

[51] Int. Cl.$^5$ .............................................. B64D 17/02
[52] U.S. Cl. .................................... 244/145; 244/142
[58] Field of Search .................... 244/142, 145, 153 R

[56] References Cited

U.S. PATENT DOCUMENTS

| | | | |
|---|---|---|---|
| Re. 26,427 | 7/1968 | Jalbert | 244/142 |
| 3,131,894 | 5/1964 | Jalbert | 244/145 |
| 3,393,885 | 7/1968 | Neumark | 244/145 |
| 3,428,277 | 2/1969 | Everett, Jr. | 244/142 |
| 3,524,613 | 8/1970 | Reuter et al. | 244/142 |
| 3,724,789 | 4/1973 | Snyder | 244/145 |
| 3,893,641 | 7/1975 | Sutton | 244/145 |
| 4,389,031 | 6/1983 | Whittington | 244/145 |
| 4,406,433 | 9/1983 | Radkey et al. | 244/145 |
| 4,470,567 | 9/1984 | Puskas | 244/145 |
| 4,684,082 | 8/1987 | Gargano | 244/145 |

Primary Examiner—Joseph F. Peters, Jr.
Assistant Examiner—Anne E. Bidwell
Attorney, Agent, or Firm—Sol Sheinbein; Melvin J. Sliwka; Stephen J. Church

[57] ABSTRACT

The upper and lower panel of a ram air inflated parachute canopy are connected interiorly of the canopy by lines extending between the panels at points spaced chordwise and spanwise of the panels so that airflow is unrestricted within the canopy and the weight and bulk of chordwise ribs is eliminated. The parachute suspension lines have connections to the lower panel at points where the interior lines connect to the lower panel and these connections may be made by loops incorporated in the lower panel. The interior line lengths and the proportions of spanwise end panels of the canopy may correspond to a triangular chordwise cross sectional shape of the canopy. The upper panel may have an extension forwardly of the lower panel with lines extending between the extension and the suspension lines to downwardly curve the extension and partially close the open forward end of the canopy.

8 Claims, 3 Drawing Sheets

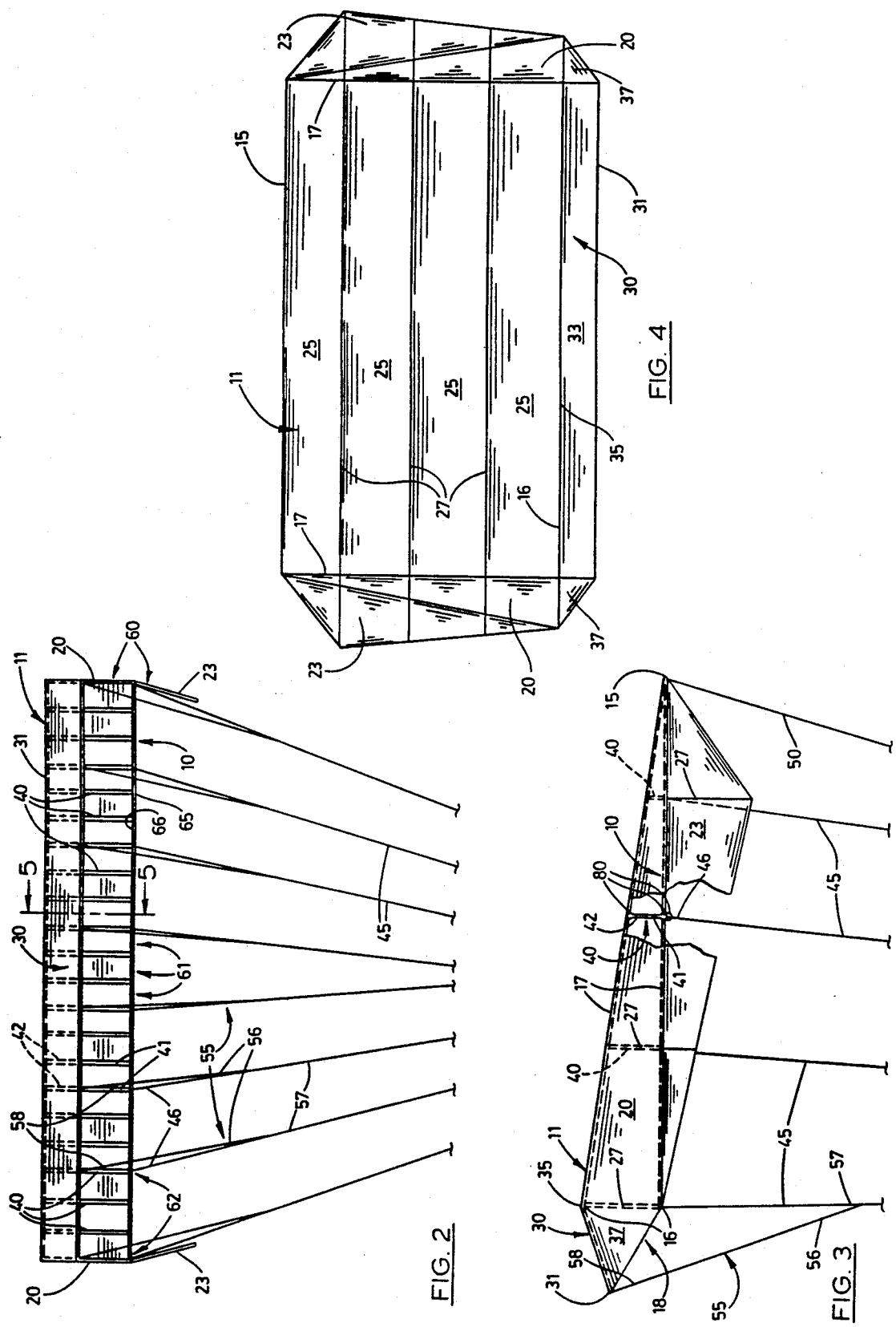

RIBLESS RAM AIR PARACHUTE

BACKGROUND OF THE INVENTION

1. Field of the Invention

The present invention pertains to aeronautics and, more particularly, pertains to the field of parachute canopy construction.

2. Description of the Related Art

Prior art ram air parachutes have a canopy formed by spaced upper and lower fabric panels connected interiorly of the canopy by a plurality of spanwise spaced ribs which are secured to the panels and which are flexible fabric panels having the shape of an airfoil cross section. The region between the upper and lower panels is forwardly open for admission therebetween of ram air pressure which is generated by forward motion of the parachute and which inflates the canopy into an airfoil constrained by the ribs to have a cross section conforming to the shape of the ribs. In prior art ram air parachutes, suspension lines depending from the canopy are secured to the lower panel at points spaced along the ribs so that suspension and other loads are tranfferred between the upper and lower panels by the ribs. The ribs divide the inflated canopy into cells spaced spanwise of the airfoil, and the ribs may have a construction providing for limited spanwise air flow through the panels between the cells to promote inflation of all the cells when, as during parachute opening or operation in a crosswind, airflow is not directly into the forward opening of the canopy. Typical constructions for this purpose include openings cut through the ribs, openings left between reinforcing tapes incorporated in the ribs, or the use of mesh fabric for the ribs.

However, in all these constructions spanwise air flow between the cells is substantially impeded by the ribs so that parachute opening may be undesirably slow for some purposes and so that the spanwise end cells often deflate during parachute maneuvers or do not fully inflate on opening. These problems, although dangerous, are usually correctable by a fully functioning parachutist, but can be uncorrectable with other loads. In any event, the ribs contribute substantially to the weight of a ram air parachute and greatly increase the volume of the parachute when packed.

SUMMARY OF THE INVENTION

A ram air inflated parachute canopy has an upper and a extending between these panels at points spaced chordwise and spanwise thereof, the upper and lower panels being connected only at their spanwise ends by chordwise panels. The interior of the canopy is thus open for substantially unrestricted airflow within the canopy to give complete, rapid, and maintained inflation, and the absence of chordwise ribs within the canopy results in it having minimal weight and having minimal bulk when packed. The parachute suspension lines are connected to the canopy interior lines and to the lower panel at predetermined such points on the lower panel by connections which may include loops incorporated into the lower panel. The spanwise end panel dimensions and the interior line lengths may correspond to a triangular chordwise cross sectional shape of the canopy. The upper panel may have an extension projecting forwardly of the lower panel and the parachute have lines connected to the forward end of this extension and cascaded to the forward suspension lines so that, when the canopy is inflated, the extension provides a downwardly curved, aerodynamic leading portion of the upper panel. Such lines connected to the extension may be arranged to partially or variably close the open forward end of the canopy to slow opening of the canopy when rapid opening is not desired.

An object of the present invention is to provide a ram air parachute which has minimal weight, inflates completely, and has minimal bulk when packed.

Another object is to provide such a parachute which is capable of very rapid opening but may be arranged to open relatively slowly.

Still another object is to provide a strong and fully effective ram air parachute canopy which has the above and other advantages and which is simple and economical to construct.

BRIEF DESCRIPTION OF THE DRAWINGS

The above and other objects, advantages, and novel features of the present invention will be apparent from the following detailed description when considered with the accompanying drawings in which:

FIG. 2 is a front elevation of the parachute canopy of FIG. 1 in an extended but uninflated condition;

FIG. 3 is a side elevation of the canopy in the extended but uninflated condition;

FIG. 4 is a plan view of material used in construction of an upper panel, end panels, and stabilizers of the canopy;

DESCRIPTION OF THE PREFERRED EMBODIMENT

Figure 1:
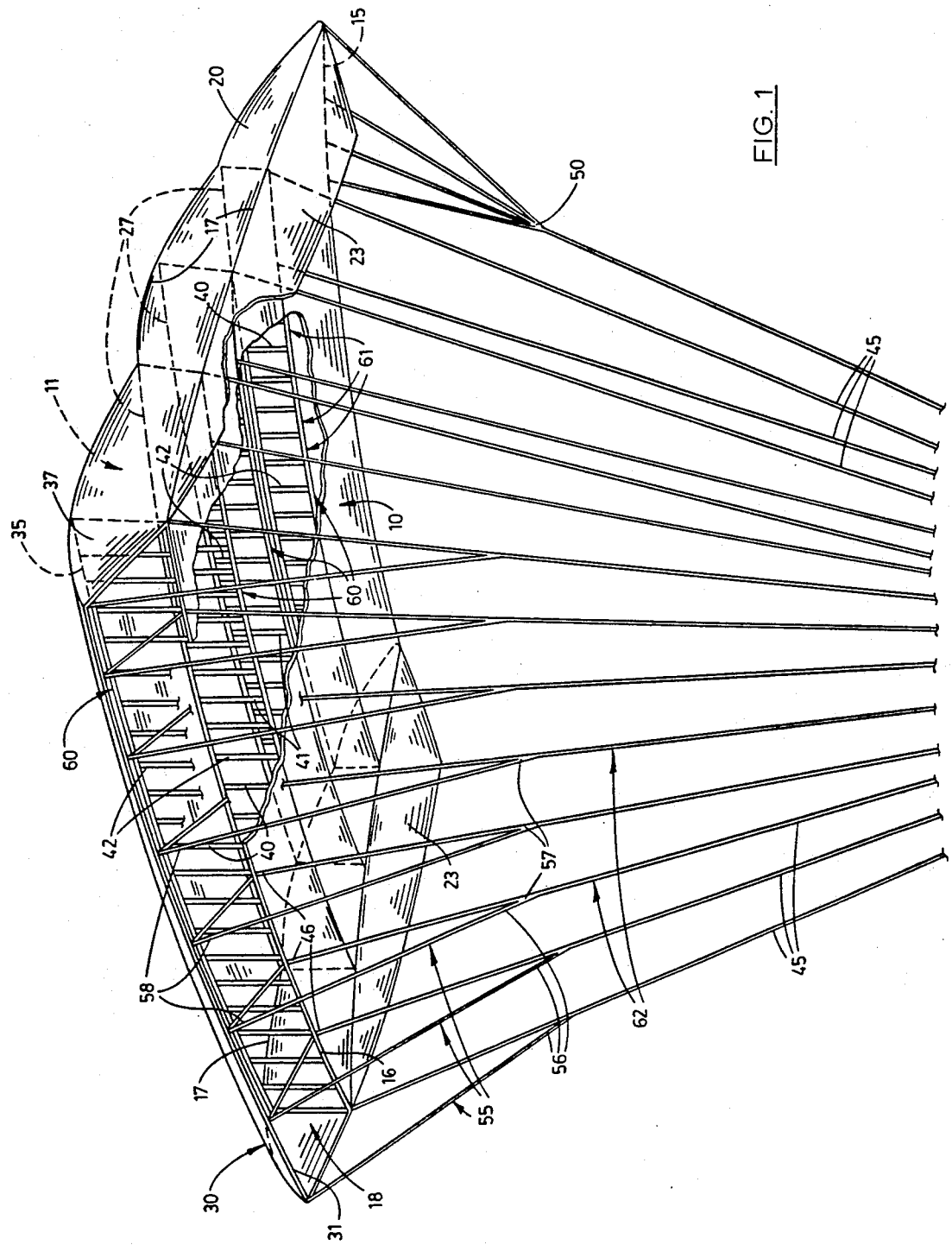
FIG. 1 is a perspective view of a ribless ram air parachute canopy embodying the present invention and depicted in an inflated condition with a portion of an upper panel depicted as cut away to show the canopy interior.

FIGS. 1-3 depict a ram air parachute canopy embodying the present invention. The canopy is similar to prior art ram air parachute canopies in having a flexible lower panel 10 on which is superimposed a flexible upper panel 11. Panels 10 and 11 are each generally rectangular, each panel having a trailing edge 15 and a leading edge 16, which extend spanwise of the canopy, and having a pair of opposite end edges 17, which extend chordwise of the canopy. The canopy is also similar to prior art canopies in that the trailing edges 15 and end edges 17 are closed and the panels 10 and 11 define between their leading edges 16 an opening 18 through which the canopy is inflated by the pressure of ram air entering through the opening when the canopy glides in a direction generally from trailing edges 15 toward leading edges 16. Panels 10 and 11 preferably have their trailing edges 15 directly connected as by any suitable seam so that air does not escape from the canopy at the trailing edges and the canopy inflates rapidly and remains inflated with the maximum ram air pressure. It is evident that the canopy has a pair of spanwise opposite end portions corresponding to the edges 17 of a panel 10 or 11, has a trailing portion corresponding to edges 15, and has a leading portion corresponding to edges 16.

Panels 10 and 11 are connected at each spanwise end of the canopy by a flexible end panel 20 as best shown in FIGS. 1 and 3. With the canopy extended but uninflated as shown in FIG. 3, each panel 20 is of elongated right triangular configuration having an apex where trailing edges 15 are connected, a hypotenuse along upper panel 11, a long side along bottom panel 10, and a short side at opening 18. Each panel 20 is thus wedge shaped and is, very generally, of airfoil configuration since the panel leading portion at edges 16 is wider than the trailing portion at edges 15 and the panel upper side at panel 11 is longer than its lower side at panel 10. As best seen from FIGS. 3 and 4, panels 20 may be conveniently constructed as extensions of upper panel 11 which are folded down to lower panel 10 and are connected thereto by seams along edges 17 of the lower panel. As shown in FIGS. 1-4, the canopy may be provided with a pair of conventional stabilizers 23 which are flexible triangular panels extending from edges 17 of panel 11.

Preferably and as shown in FIG. 4, panel 11, panels 20, and stabilizers 23 are constructed from a single sheet of material. This sheet may be formed from a plurality of parallel lengths 25 of any suitable flexible parachute material, these lengths extending spanwise of the canopy and being joined at the edges of the lengths by any suitable seams 27 which also extend spanwise of the canopy.

The canopy has, preferably and as shown in FIGS. 1-4, a nose panel 30 extending from and along the leading edge 16 of upper panel 11, the nose panel extending from the upper panel oppositely of the trailing edge 15 thereof and beyond the lower panel 10 in a direction from trailing edges 15 toward leading edges 16. Nose panel 30 terminates oppositely of panel 11 in a forward edge 31 extending spanwise of the canopy and parallel to edges 15 and 17. Nose panel 30, preferably and as shown in FIG. 4, is a length 33 of parachute fabric joined to the leading edge 16 of the upper panel 11 by a seam 35 similar to seams 27. Length 33 may have triangular portions 37 extending oppositely and outwardly from upper panel edges 17 to form a pair of panels disposed outwardly of opening 18 and forwardly of end panels 20.

Figure 5:
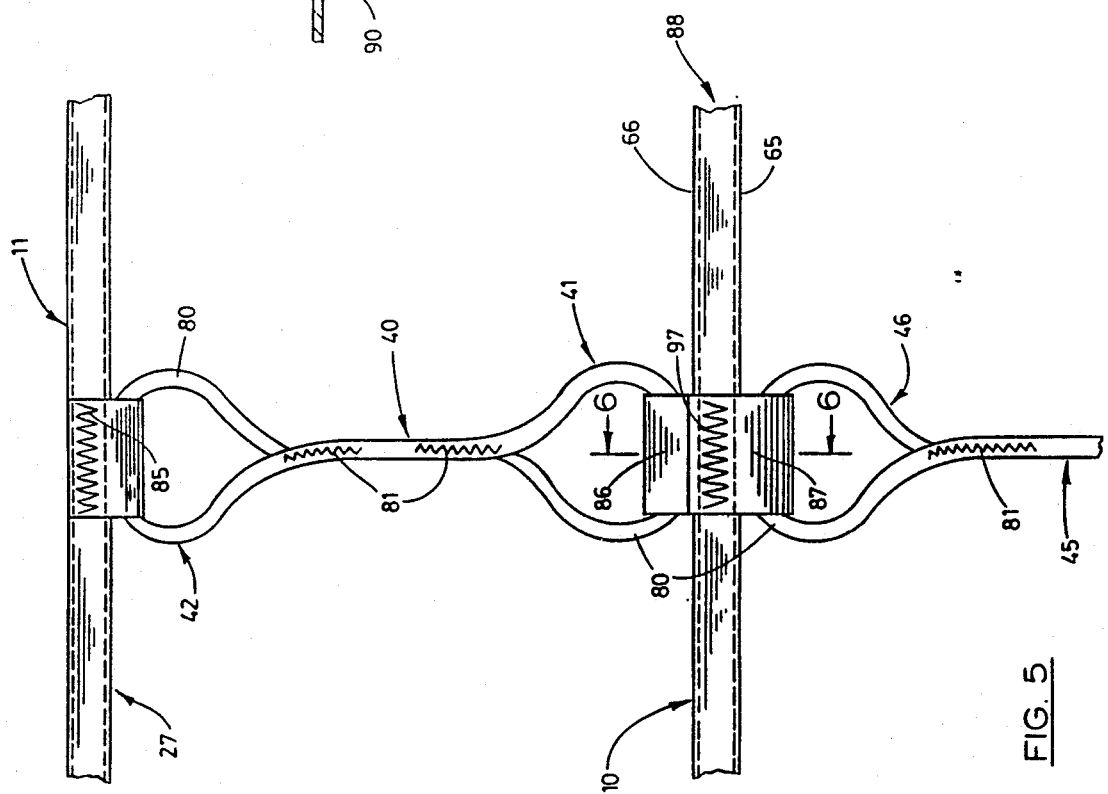
FIG. 5 is a view from the position of line 5—5 of FIG. 2 and at an enlarged scale showing lines and connections therefor used in the canopy.

As best shown in FIGS. 1, 2, and 5, the canopy has a plurality of interior lines 40 which extend between and connect panel 10 and 11. Lines 40 are spaced chordwise and spanwise of panels 10 and 11 so that ram air from opening 18 can flow around lines 40 and chordwise and spanwise within the canopy between these panels without being impeded by lines 40. Panels 10 and 11 are preferably connected between their end edges 17 and between their trailing edges 15 and leading edges 16 only by lines 40. Each line 40 has a lower end 41, which is secured to panel 10, and has an upper end 42 which is secured to panel 11. Specific and preferable arrangements for the construction of lines 40 and for their chordwise and spanwise spacing and connection to the balance of the canopy are subsequently described in greater detail.

The canopy has a plurality of suspension lines 45 spaced spanwise and chordwise of the canopy and extending from lower panel 10, each suspension line having an upper end 46 secured to the lower panel. Lines 45 extend downwardly from panel 10 when the canopy is in use to any suitable risers or other elements, not shown, which may be of conventional construction for connecting the canopy to a payload suspended therefrom. Specific and preferable arrangements for the spacing of suspension lines 45 in relation to interior lines 40 and for the connection of the suspension lines to the lower panel 10 and interior lines 40 are subsequently described in greater detail.

The canopy may be provided with conventional steering or braking lines 50 which are connected to trailing edges 15 and which are not involved in the present invention.

A number of the suspension lines 45 are connected to lower panel 10 at its leading edge 16 at locations spaced spanwise thereof and the canopy has an equal number of nose lines 55 corresponding individually to these suspension lines. Each nose line has a lower end 56 secured to the corresponding suspension line at a point 57 thereon spaced downwardly of panel 10 and has an upper end 58 secured to nose panel 30 at leading edge 31 thereof. The lengths of nose lines 55 are such that, when the canopy is inflated by ram air as shown in FIG. 1, nose panel 30 is constrained by the nose lines so that the nose panel cannot fold rearwardly and is urged to curve downwardly toward lower panel 10 from the leading edge 16 of upper panel 11 and thus to be disposed before and across opening 18 in partially closing relation thereto. Nose panel 30 and lines 55 thus serve to restrict admission of ram air into opening 18 and thereby slow opening of the canopy. Some or all of the nose lines 55 may have moveable or selectively releasable connecting arrangements, not shown, to their corresponding suspension lines at locations which, in effect, shorten the nose lines and result in closing opening 18 to a greater extent than shown in FIG. 1 in which lines 55 are depicted as fully extended. By such arrangements, the opening of the canopy may be slowed initially to any desired extent and relatively more rapid opening provided later. Specific such arrangements are not depicted since they may vary with the use of a ram air parachute canopy embodying the present invention and since conventional arrangements for this purpose are known to those skilled in the art of parachute construction.

It is evident from FIG. 1 that the forwardly and downwardly curved configuration into which nose panel 30 is drawn by lines 55 provides the upper forward portion of the inflated canopy with an aerodynamic form similar to that used for the corresponding portion of conventional airfoils. In a ram air parachute canopy of the present invention, panel 30 suppresses oscillations of the inflated canopy about a spanwise axis and provides such an aerodynamic form giving the canopy effective aerodynamics for forward gliding movement while descending.

The spacing of interior lines 40 and suspension lines 45 relative to each other and to panels 10 and 11 and the connections of these lines and panels will now be described in relation to a ram air parachute canopy embodying the present invention and of a size believed effective for use with a load corresponding to a single person. In such a panel, the lower panel 10 and upper panel 11 dimensions corresponding to the uninflated canopy condition shown in FIGS. 2 and 3 are about 24 feet (about 7.3 meters) spanwise and about 11 feet (about 3.3 meters) chordwise, resulting in a canopy of about 260 square feet (about 24 square meters).

Referring now to FIGS. 1-5 which depict such a canopy, it is seen that upper panel 11 is constructed of the five spanwise lengths 25 and 33 of any suitable parachute fabric joined by the four spanwise seams 27 and 35, these seams corresponding individually to four chordwise spaced and spanwise extending rows 60 of interior lines 40 and suspension lines 45. The four rows 60 correspond individually to three spanwise seams of lower panel 10, which correspond to seams 27 and to lower panel leading edge 1 which is similar in position and construction to seam 33. The canopy has twenty-two spanwise spaced and chordwise extending rows 61 of interior lines, 40 each row 61 consisting of four of the lines 40 which correspond to one of the rows 60. One of the rows 61 is disposed at each connected pair of panel 10 and 11 end edges 17, and twenty of the rows 61 are substantially equally spaced therebetween so that each panel 10 and 11 has eighty-eight locations thereon at which the line ends 41 and 42 are, respectively, secured. The canopy has eight spanwise extending rows 62 of the suspension lines 45, one of the rows 62 being disposed at each connected pair of panel 10 and 11 end edges 17, and six of the rows 61 being substantially equally spaced spanwise therebetween and aligned with each third chordwise extending row 61 of interior lines 40. Each lower panel 11 thus has thirty-two locations thereon at which the upper suspension line ends 46 are secured to the lower panel at the lower side 65 thereof oppositely of one of the eighty-eight locations at the upper side 66 thereof at which a interior line lower end 41 is secured. There are thus thirty-two such lower side 65 locations substantially coinciding with thirty-two such upper side 66 locations at which interior lines 40 are secured to panel 10. The depicted arrangement with two of the interior lines 40 at locations on panel 10 not having a suspension line 45 between such locations having a suspension line has been found effective for suspension and aerodynamic purposes in a parachute canopy as set forth above, but other arrangements may be equally effective, especially in parachutes for other loads.

Figure 6:
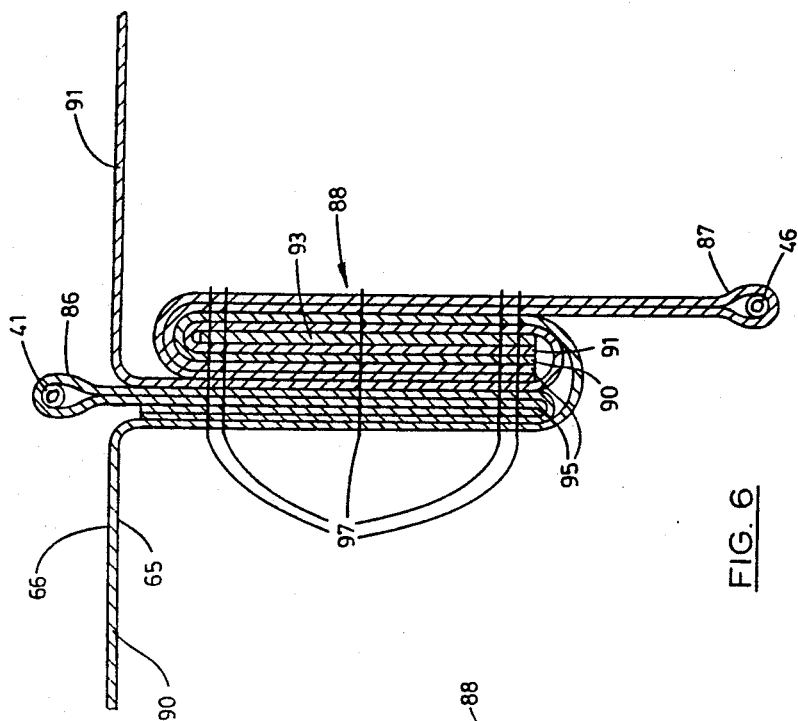
FIG. 6 is a section taken at line 6—6 of FIG. 5 and at a further enlarged scale showing a seam and attached elements of the canopy.

Referring now to FIGS. 5 and 6, in which the preferred construction of one of the thirty-two lower panel 10 regions incorporating such coincident locations is shown in detail in FIG. 5 together with the associated region of upper panel 11, and this construction of a lower panel spanwise seam in this lower panel region is shown, somewhat schematically, in FIG. 6.

Interior lines 40 and suspension lines 45 are constructed, in a well-known manner, from cords of "DACRON", a trademark for synthetic fiber which has, for parachute purposes, a moderate modulus of elasticity. Lines 40 and 45 may be constructed of such cord of circular cross section and about ⅛ inch (about 3 mm) diameter conventionally used for parachute suspension lines. Line ends 41, 42, and 46 are formed into loops 80 of cord by zig-zag stitches 81 and each cord loop 80 is looped through a loop 85, 86, or 87 of tape of "KEVLAR", a trademark for a synthetic aramid fiber having, for parachute purposes, a high modulus of elasticity. Loop 85 is incorporated in any suitable manner into a spanwise seam, such as a seam 27 or 35, of upper panel 11 to receive line end 42. Loops 86 and 87 are incorporated into lower panel 10 at a spanwise seam thereof which corresponds to such 10 upper panel seam and which is identified by numeral 88 in FIGS. 5 and 6. Loop 86 is disposed at the upper side of lower panel 10 and thus toward upper panel 11 and receives lower end 41 of line 40. Loop 87 is disposed at the lower side of the lower panel and thus oppositely thereof from the upper panel and receives end 46 of line 45. It is evident that, as a result of this construction, loads on suspension line 45 are transferred at the lower panel seam to the lower panel and are transferred through the tape loops 86 and 87 to the interior line 40 and thereby to the upper panel.

FIGS. 5 and 6 show a preferred construction for the incorporation of loops 86 and 87 into a spanwise seam of lower panel 10 where the edges 90 and 91 of two lengths of parachute fabric are joined. A shown in FIG. 6, edges 90 and 91 are folded together about a spanwise length of any suitable tape 93. At each location along the seam where a pair of loops 80 of lines 40 and 45 are to be secured to panel 10, a pair of relatively short lengths 95 of KEVLAR tape of about 1 inch (about 2.5 cm) width are folded so as to form loops 86 and 87 and inserted into the folded edges with the loops projecting oppositely from the panel. The folded elements are then fixed together by any suitable stitching indicated by numeral 97.

Referring now to FIGS. 1 and 3 and to the above description of the location of interior lines 40 in relation to the spanwise seams 27 and 35, it is evident that in FIG. 3, which is a side view of a ram air parachute canopy of the present invention at end panel 20 and has drawing lines representing seams 27 and 35, interior lines 40 coincide with these drawing lines as indicated by the numerals 40 in parenthesis. Interior lines 40 thus have predetermined lengths corresponding to the triangular shape of panel 20 so as to give the canopy a chord wise cross section which is triangular when the canopy is extended but not inflated. In a canopy having the dimensions set forth above, it has been found that effective aerodynamic characteristics result when the length of the interior lines 40 forming the forward one of the spanwise rows 60 thereof corresponds to a distance between the leading edges 17 of about 5 inches (about 12.5 cm) and when the lengths of the interior lines of the other such rows are shorter in linear proportion corresponding to such triangular shape. In this canopy, it has been found effective to have nose lines 55 of a length such that nose panel leading edge 31 is disposed centrally of opening 18 in a direction between leading edges 16 when the canopy is inflated Obviously, many modifications and variations of the present invention are possible in light of the above teachings. It is, therefore, to be understood that the invention may be practiced within the scope of the following claims other than as specifically described herein.

What is claimed is:

1. A ram air parachute canopy having a pair of spanwise opposite end portions and chordwise opposite leading and trailing portions, the canopy comprising:
   an upper flexible panel;
   a lower flexible panel;
   mean connecting said panels at the end portions and the trailing portions for retaining ram air pressure between said panels to inflate the canopy by admission of ram air between said panels at said leading portion; and
   a plurality of interior lines extending between said panels at locations spaced spanwise and chordwise of the canopy, each interior line having a first end secured to the lower panel, a second end secured to the upper panel, and a predetermined length so that the canopy has a predetermined chordwise cross section, said upper panel and said lower panel being connected between said end portions and between said leading and trailing portions only by said interior lines.

2. A ram air parachute canopy having a pair of spanwise opposite end portions and chordwise opposite leading and trailing portions, the canopy comprising:
an upper flexible panel;
a lower flexible panel;
mean connecting said panels at the end portions and the trailing portions for retaining ram air pressure between said panels to inflate the canopy by admission of ram air between said panels at said leading portion; and
a plurality of interior lines extending between said panels at locations spaced spanwise and chordwise of the canopy, each interior line having a first end secured to the lower panel, a second end secured to the upper panel, and a predetermined length so that the canopy has a predetermined chordwise cross section.
a plurality of suspension lines each having one end secured to said lower panel at a location thereon at which one of said first ends of said interior lines is secured.
said lower panel having an upper side disposed toward said upper panel and having an opposite lower side; and the parachute canopy having at each of said lower panel locations;
a first loop fixed to said lower panel at said upper side thereof;
a second loop fixed to said lower panel at said lower side thereof;
the first end of an interior line corresponding to the location connected to said first loop; and
said one end of a suspension line corresponding to the location connected to said second loop.

3. The parachute canopy of claim 2 wherein:
said lower panel is constructed of a plurality of lengths of flexible material, said lengths extending spanwise of the canopy and being joined by seams extending spanwise of the canopy; and
said first loop and said second loop are fixed to said lower panel at one of said seams.

4. A ram air parachute canopy having a pair of spanwise opposite end portions and chordwise opposite leading and trailing portions, the canopy comprising:
an upper flexible panel;
a lower flexible panel;
means connecting said panels at the end portions and the trailing portions for retaining ram air pressure between said panels to inflate the canopy by admission of ram air between said panels at said leading portion; and
a plurality of interior lines extending between said panels at locations spaced spanwise and chordwise of the canopy, each interior line having a first end secured to the lower panel, a second end secured to the upper panel, and a predetermined length so that the canopy has a predetermined chordwise cross section.
a flexible nose panel disposed at said leading portion of the canopy and extending from said upper panel oppositely of said trailing portion and beyond said lower panel.
wherein in said parachute canopy:
the upper panel and the lower panel each have a leading edge disposed at said leading portion of the canopy and extending spanwise thereof;
said nose panel extends from the leading edge of the upper panel and has a forward edge extending spanwise of the canopy; and
the canopy has a plurality of suspension lines secured to said lower panel at locations spaced spanwise of the canopy at the leading edge of said lower panel, and
wherein said parachute canopy has a plurality of nose lines for urging said nose panel toward said lower panel when the canopy is inflated so that said nose panel curves downwardly from said upper panel, each of said nose lines having one end connected to one of said suspension lines at a point thereon spaced from said lower panel and having another end secured to said leading edge of said nose panel.

5. A ram air parachute canopy having a pair of spanwise opposite end portions and chordwise opposite leading and trailing portions, the canopy comprising:
an upper flexible panel;
a lower flexible panel;
means connecting said panels at the end portions and the trailing portions for retaining ram air pressure between said panels to inflate the canopy by admission of ram air between said panels at said leading portion; and
a plurality of interior lines extending between said panels at locations spaced spanwise and chordwise of the canopy, each interior line having a first end secured to the lower panel, a second end secured to the upper panel, and a predetermined length so that the canopy has a predetermined chordwise cross section. the upper panel and the lower panel each having a leading edge disposed at said leading portion of the canopy and extending spanwise thereof, said panels defining between the leading edges thereof an opening for said admission of ram air; and the canopy having means partially closing said opening for restricting said admission so as to slow inflation of the canopy.

6. The parachute canopy of claim 5 wherein the canopy has a plurality of suspension lines secured to said lower panel at locations thereon spaced spanwise of the canopy at the leading edge of said lower panel, and said closing means comprises:
a flexible nose panel extending from the leading edge of said upper panel and
a plurality of nose lines, each nose line having one end connected to one of said suspension lines at a point on the suspension line spaced from said lower panel, having an opposite end secured to said nose panel, and having a length such that the nose line draws said nose panel toward said lower panel and across said opening.

7. In a parachute canopy having a lower flexible panel and a superimposed upper flexible panel, the panels being connected along their trailing edges and chordwise end edges and defining an opening between their leading edges for admission of ram air to inflate the canopy into a airfoil-like shape; the canopy having flexible elements extending between said panels interiorly of the canopy, said flexible elements having a predetermined configuration in a direction between the panels and being secured thereto so that the configuration of said elements determines the chordwise cross section of the canopy when the canopy is inflated, and the canopy having a plurality of suspension lines extending downwardly from the leading edge of the lower panel at locations spaced spanwise thereof, the improvement comprising:
said elements being a plurality of interior lines space spanwise and chordwise of the panels so that flow of said ram air within the panel is around said lines an is substantially unimpeded thereby;

a flexible nose panel extending along and from the leading edge of the upper panel; and a plurality of nose lines extending between the nose panel and said suspension lines and having a length such that the nose panel is disposed in partially closing relation to said opening when the canopy is inflated.

8. A ram air parachute canopy comprising:

a lower flexible panel and a superimposed upper flexible panel, said panels each having individual trailing edges, leading edges, and opposite chordwise end edges and said panels being connected along said trailing edges and end edges and defining an opening between said leading edges for admission of ram air to inflate the canopy into an airfoil-like shape;

a plurality of interior lines spaced spanwise and chordwise of the panels and extending therebetween at predetermined locations thereon so that flow of said ram air within the panel is around said lines and is substantially unimpeded thereby, said interior lines having lower ends secured to the lower panel, opposite upper ends secured to the upper panel, and predetermined lengths determining said airfoil-like shape;

a plurality of suspension lines extending from said lower panel and secured to said lower panel at locations thereon substantially coinciding with locations at which said lower ends of said interior lines are secured to said lower panel;

a flexible nose panel extending from the leading edge of said upper panel; and a plurality of nose lines extending between said suspension lines and said nose panel, said nose line shaving lengths such that said nose panel is disposed before said opening when the canopy is inflated by said ram air.

wherein in said parachute canopy said lower panel locations at which said interior lines and said suspension lines are secured are disposed at a seam of said lower panel, and at each of said locations:

a first loop is secured in said seam and disposed toward said upper panel, and a second loop is secured in said seam and disposed oppositely thereof from said upper panel;

the lower end of an interior line corresponding to the location terminates in a loop looping said first loop; and a suspension line corresponding to the location terminates in a loop looping said second loop, whereby loads on said suspension line are transferred at said seam to said lower panel and are transferred through said first loop and said second loop to said interior line and said upper panel.

* * * * *